US007813523B1

(12) United States Patent
Larsson

(10) Patent No.: US 7,813,523 B1
(45) Date of Patent: Oct. 12, 2010

(54) DISPERSION AND METAL PARTICLE SIZE CHARACTERIZATION OF NANOCATALYSTS

(75) Inventor: Mats I. Larsson, Sunnyvale, CA (US)

(73) Assignee: Nanostellar, Inc., Redwood City, CA (US)

( * ) Notice: Subject to any disclaimer, the term of this patent is extended or adjusted under 35 U.S.C. 154(b) by 861 days.

(21) Appl. No.: 11/695,943

(22) Filed: Apr. 3, 2007

(51) Int. Cl.
*G06K 9/00* (2006.01)
*B01J 23/00* (2006.01)
(52) U.S. Cl. ........................................ 382/100; 502/300
(58) Field of Classification Search ................ 382/100, 382/252; 502/12, 35, 84, 100, 101, 102, 502/103, 185, 240, 300, 407, 514
See application file for complete search history.

(56) References Cited

U.S. PATENT DOCUMENTS 6,458,741 B1 * 10/2002 Roark et al. ................. 502/303
7,585,808 B2 * 9/2009 Malek et al. ................ 502/300

* cited by examiner

*Primary Examiner*—Abolfazl Tabatabai
(74) *Attorney, Agent, or Firm*—Patterson & Sheridan, LLP

(57) ABSTRACT

A relationship between dispersion and surface-averaged metal particle size is provided so that either dispersion can be determined from measured surface-averaged metal particle size or surface-averaged metal particle size can be determined from measured dispersion. The method can be applied to catalysts having a single metal species as well as catalysts having multiple metal species. The size of the supported metal particles in the catalyst sample may be determined using transmission electron microscopy images of supported metal particles in the catalyst sample. The dispersion of the supported metal particles in the catalyst sample may be determined using chemisorption tests on the catalyst sample.

24 Claims, 4 Drawing Sheets

DISPERSION AND METAL PARTICLE SIZE CHARACTERIZATION OF NANOCATALYSTS

BACKGROUND OF THE INVENTION

1. Field of the Invention

The present invention generally relates to catalyst characterization and, more particularly, to determining the dispersion and metal particle size relationships of supported nanocatalysts employed in heterogeneous catalysis.

2. Description of the Related Art

The performance of catalysts is highly dependent on their physical and chemical properties. However, it is often difficult to directly measure physical and chemical properties of catalysts, especially those catalysts that contain metal particles whose average size is less than 100 nm (hereafter called "nanocatalysts"). Catalyst developers therefore rely on sophisticated characterization techniques to determine the physical and chemical properties and performance characteristics of new catalyst designs.

Dispersion and metal particle size distribution influence the performance of catalysts. Dispersion D is defined according to $D = N_{Tot}^S / N_{Tot}^S$, where $N_{Tot}^S$ is total amount of metal surface atoms and $N_{Tot}$ is all metal atoms in the catalyst. Dispersion is an important property in catalysis because only atoms that are exposed to the surface are able to play a role in catalytic surface reactions. Catalyst metal particle size is also an important property because larger metal particles have less percentage of their atoms at the surface. As a consequence, a catalyst with smaller metal particles will usually outperform an equivalent amount of catalyst with identical metal concentration, but having larger metal particles.

The relationship between dispersion and metal particle size of catalysts has been studied in the publication by G. Bergeret and P. Gallezot, "Metal Particle Size and Dispersion Measurements," Handbook of Heterogeneous Catalysis, Vol. 2, pp. 439-442, Wiley-VCH (1997). The model for the dispersion and metal particle size relationship proposed in that publication is as follows:

$$D^{B-G} = \frac{6 \times V_0}{A_m <d>_S},$$

where $D^{B-G}$ is the dispersion; $V_0$ is the atomic volume; $A_m$ is the atomic area of the topmost surface atoms. Bergeret and Gallezot suggest to use $A_m = 0.081$ nm$^2$, which gives an effective value for the low-index surfaces (111), (110) and (100). Note, however that the exact value of $A_m$ in practice is unknown for a given sample, and can deviate significantly from $A_m = 0.081$ nm$^2$. $<d>_S$ is the surface-averaged metal particle size defined according to $$<d>_s = \frac{<d^3>}{<d^2>},$$

where $<d^3>$ is the arithmetic average value of $d^3$ and $<d^2>$ the arithmetic average value of $d^2$.

The model noted above is deficient for several reasons. First, it does not work for small metal particles because it yields a dispersion value greater than 1.0. By definition, dispersion cannot be greater than 1.0. Second, the value of $A_m$ is typically assumed. In general, determining $A_m$ accurately is either very difficult (i.e., involves lengthy and laborious measurements of metal particle images) or not possible at all.

SUMMARY OF THE INVENTION

Embodiments of the present invention provide an improved method for determining the dispersion and metal particle size relationship of nanocatalysts employed in heterogeneous catalysis. The improved method is more accurate than methods currently used, especially for smaller metal particle sizes, and also for larger ones. Further, the methods according to embodiments of the present invention can be applied more efficiently than methods currently used, because they do not require a determination of a parameter that is very difficult to determine accurately, i.e., the atomic area of the topmost surface atoms.

According to an embodiment of the present invention, a catalyst characterization method includes the steps of preparing a catalyst sample for analysis, measuring the size of metal particles in the catalyst sample and determining $<d>_S$ and $V_0$ of the metal particles therefrom, and computing an approximate dispersion value ($D^{app}$) of the metal particles based on the following relationship:

$$D^{app} = 1 - \left(1 - \frac{2 \times V_0^{1/3}}{<d>_S}\right)^3.$$

The method can be applied to a catalyst having a single metal species or to a catalyst having metal alloys so long as Vegard's law is valid. The size of the metal particles in the catalyst sample may be determined using transmission electron microscopy (TEM) images of the catalyst sample.

According to another embodiment of the present invention, a catalyst characterization method includes the steps of preparing a catalyst sample for analysis, determining D and $V_0$ of the metal particles in the catalyst sample, and computing an approximate surface-averaged diameter of the metal particles ($<d>_S^{app}$) based on the following relationship:

$$<d>_s^{app} = \frac{2 \times V_0^{1/3}}{1 - (1-D)^{1/3}}.$$

The method can be applied to a catalyst having a single metal species or to a catalyst having metal alloys so long as Vegard's law is valid. The dispersion of the metal particles in the catalyst sample may be determined using chemisorption tests on the catalyst sample.

The present invention also provides a computer-readable storage medium having stored thereon instructions to be executed in a computer system to determine a physical property of a catalyst sample. In accordance with an embodiment of the present invention, these instructions cause the computer system to carry out the steps of receiving inputs specifying an input value representative of a physical property of the catalyst sample and one or more types of metal species, computing $V_0$ of the specified metal species, computing an output value representative of a physical property of the catalyst sample based on one of the following equations:

$$D^{app} = 1 - \left(1 - \frac{2 \times V_0^{1/3}}{<d>_S}\right)^3,$$

if $<d>_S$ of the metal particles in the catalyst sample is the input value, or $$<d>_S^{app} = \frac{2 \times V_0^{1/3}}{1 - (1-D)^{1/3}},$$

if D of the metal particles in the catalyst sample is the input value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
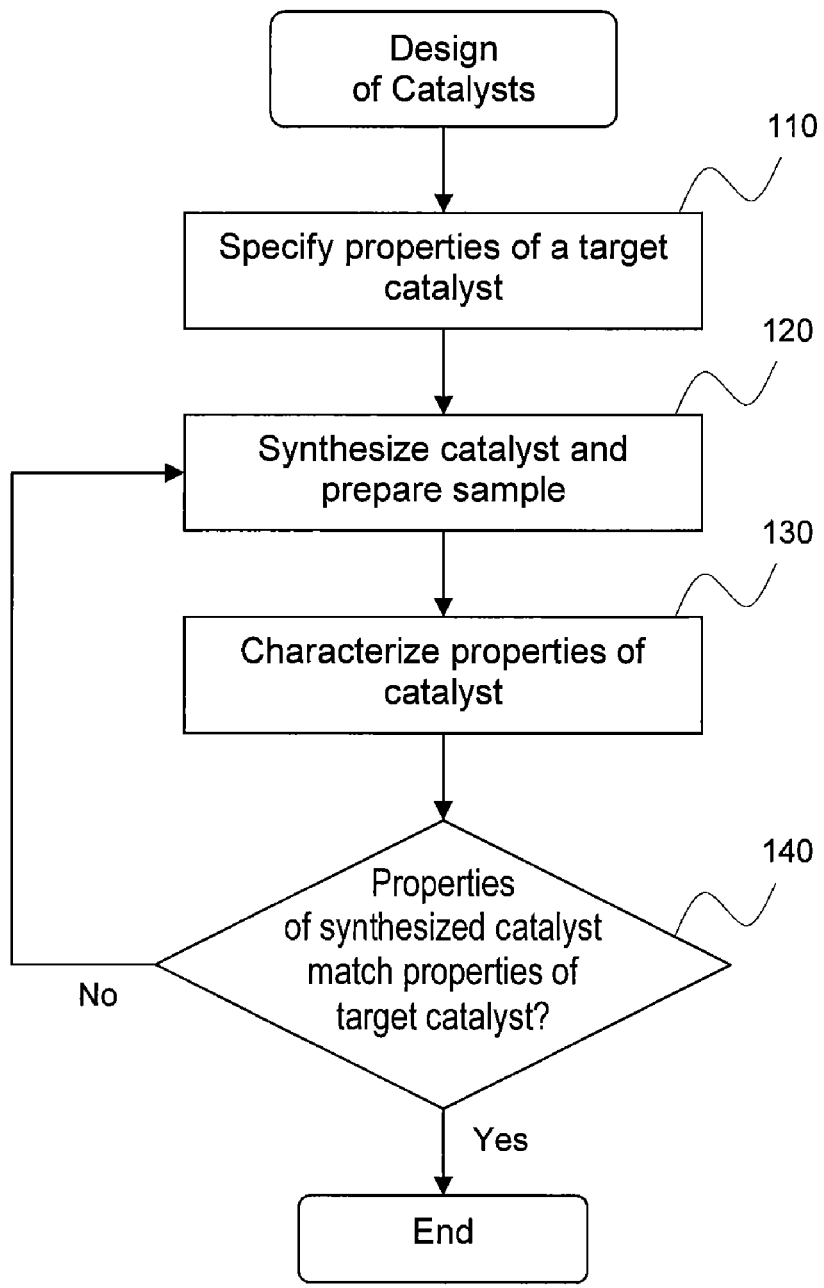
FIG. 1 is a flow diagram illustrating a rational design process for a catalyst in which embodiments of the present invention can be practiced.

FIG. 1 is a flow diagram illustrating the design process of catalysts in which embodiments of the present invention can be practiced. In step 110, the composition and the properties of a target catalyst are specified. The composition indicates the metal species and the support material. It also specifies the weight ratio of the metal species if it includes more than one metal species. The properties may include the metal particle size distribution. A catalyst with the target composition is then synthesized in step 120. In addition, a sample of the synthesized catalyst is prepared for subsequent characterization in step 130, where the properties of the catalyst sample are determined. Then, the properties of the target catalyst are compared against the properties of the synthesized catalyst in step 140. If there is a good match, the synthesized catalyst is accepted, and the process ends. If a match is not obtained within a given predetermined range of acceptable values, the process returns to step 120, where a catalyst with the target composition is synthesized according to a different synthesis method.

In the process described above, the surface-averaged metal particle size may be determined in step 130. In such a case, there are different ways of obtaining surface-averaged metal particle size known to those skilled in the art, including those involving advanced electron microscopy techniques, including transmission electron microscopy (TEM), scanning transmission electron microscopy (STEM), and scanning electron microscopy (SEM). For samples not exhibiting alloy induced diffraction line broadening, the surface-averaged metal particle size of a catalyst sample can be determined by collecting x-ray diffraction data from the catalyst sample and then employing the Warren-Averbach method. Alternatively, dispersion may be determined in step 130. In such a case, chemisorption tests are conducted on the catalyst sample and the dispersion is derived from results of the chemisorption tests. Any of the chemisorption tests known to those skilled in the art may be used, such as CO or $H_2$ adsorption.

The properties that are characterized according to embodiments of the present invention include dispersion and surface-averaged metal particle size. More specifically, a mathematical relationship between D and $<d>_S$ is provided so that either D can be determined from measured $<d>_S$, or $<d>_S$ can be determined from measured D. The methodology presented herein for establishing the mathematical relationship between D and $<d>_S$ is based on the assumptions that metal particles are spherical and that they can be modeled in an onion-like way, i.e., the particles are constructed of equi-centered spherical shells of increasing diameter. With these assumptions, the inventor has discovered that the number of atoms in the surface shell, $n^S$, can be expressed as a function of particle diameter, d, in the following way:

$$n^S(d) = \pi\left(\frac{d^2}{V_0^{2/3}} - \frac{2d}{V_0^{1/3}} + \frac{4}{3}\right),$$

where $V_0 = a_{fcc}^3/4$, for fcc crystals and $a_{fcc}$ is the lattice constant. The total number of atoms, $n^{Tot}$, can be expressed as a function of particle diameter, d:

$$n^{Tot}(d) = \frac{\pi d^3}{6V_0},$$

as is well known to those skilled in the art. In general, $V_0$, can be expressed as: $V_0 = V_c/N_c$, where $V_c$ is the volume of the conventional unit cell and $N_c$ is the number of atoms it contains. For a triclinic crystal system, the expression for $V_c$ is:

$$V_c = abc\sqrt{1-\cos^2(\alpha)-\cos^2(\beta)-\cos^2(\gamma)+2\cos(\alpha)\cos(\beta)\cos(\gamma)},$$

where a, b, c are lattice parameters and $\alpha$, $\beta$, $\gamma$ are the related angles. For the cubic crystal system, $a=b=c$ and $\alpha=\beta=\gamma=90°$. These formulae are valid for alloys so long as Vegard's law is valid.

The inventor has determined that the dispersion expression for spherical particles is:

$$D = 6(V_0)^{1/3} \times \frac{<d^2>}{<d^3>} - 12(V_0)^{2/3} \times \frac{<d>}{<d^3>} + 8V_0 \times \frac{1}{<d^3>},$$

where $<d>$, $<d^2>$, and $<d^3>$ are the raw moments of the diameters of the metal particles (where $<>$ denotes the arithmetic mean). If log-normal distribution is assumed, which is very often the case, D can equivalently be expressed as a function of, $<d>_S$ and the volume-averaged diameter, $$<d>_V \left(\text{defined as}: <d>_V = \frac{<d^4>}{<d^3>}\right),$$

in the following way:

$$D = \frac{6 \times V_0^{1/3}}{<d>_S} - \frac{12 \times V_0^{2/3}}{<d>_S^2} + \frac{8 \times V_0 \times K^3}{<d>_S^3},$$

where $K=<d>_V/<d>_S$. Because it is cumbersome to measure both $<d>_S$ and $<d>_V$, the inventor has discovered an excellent approximation of the shell model expression for dispersion. The approximation of dispersion, $D^{app}$, as a function of $<d>_S$ is $$D^{app} = 1 - \left(1 - \frac{2 \times V_0^{1/3}}{<d>_S}\right)^3,$$

and an excellent approximation of the surface-averaged diameter, $<d>_S^{app}$, as a function of D is:

$$<d>_S^{app} = \frac{2 \times V_0^{1/3}}{1-(1-D)^{1/3}}.$$

Figure 2:
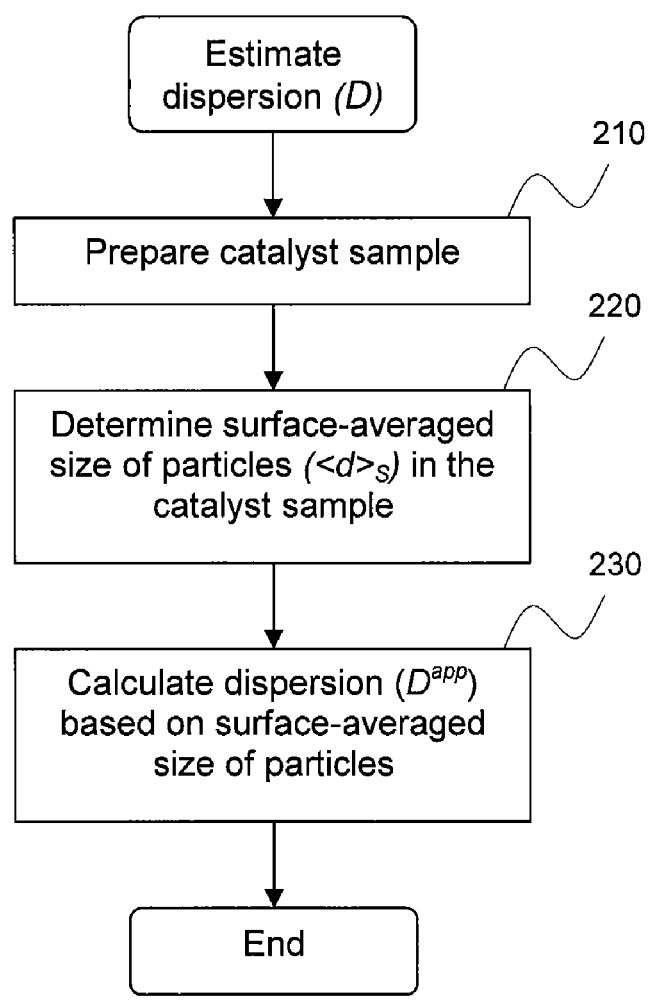
FIG. 2 is a flow diagram illustrating the steps carried out to estimate catalyst dispersion based on its measured metal particle size.

FIG. 2 is a flow diagram illustrating the steps carried out to estimate catalyst dispersion based on its measured metal particle size. In step 210, a catalyst sample is prepared. In step 220, $<d>_S$ of the catalyst sample is determined. There are different ways of obtaining $<d>_S$ known to those skilled in the art, including those involving advanced electron microscopy techniques such as transmission electron microscopy (TEM), scanning transmission electron microscopy (STEM), and scanning electron microscopy (SEM). For samples not exhibiting alloy induced diffraction line broadening, $<d>_S$ of a catalyst sample can also be determined by collecting x-ray diffraction data from the catalyst sample and then employing the Warren-Averbach method. In step 230, $D^{app}$, is determined from the measured $<d>_S$, using the expression:

$$D^{app} = 1 - \left(1 - \frac{2 \times V_0^{1/3}}{<d>_S}\right)^3.$$

Figure 3:
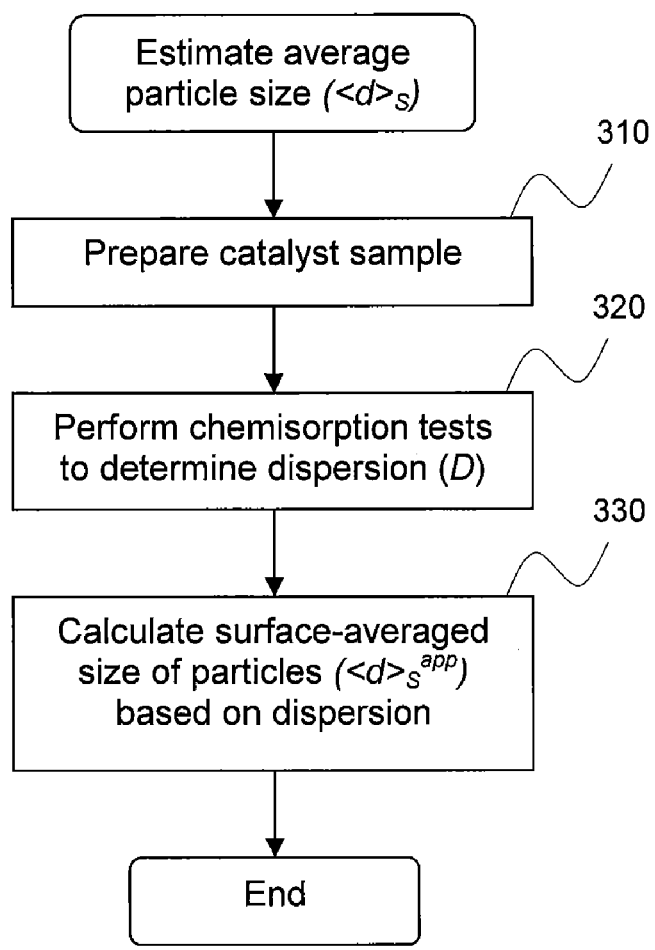
FIG. 3 is a flow diagram illustrating the steps carried out to estimate catalyst metal particle size based on its measured dispersion.

FIG. 3 is a flow diagram illustrating the steps carried out to estimate catalyst metal particle size based on its measured dispersion. In step 310, a catalyst sample is prepared. In step 320, dispersion of metal particles in the catalyst sample is determined through methods known to those skilled in the art, such as chemisorption tests, X-ray absorption (See, A. Morlang et al., "Bimetallic Pt/Pd Diesel Oxidation Catalysts," Applied Catalysis B: Environmental 60, pp. 191-199 (2005)), and Super ESCA (See, A. Baraldi, et al., "Real-time X-ray Photoelectron Spectroscopy of Surface Reactions," Surface Science Report 49, pp. 169-224 (2003)). Then, in step 330, the surface-averaged diameter of the catalyst sample, $<d>_S^{app}$, is determined from the measured dispersion using the expression:

$$<d>_S^{app} = \frac{2 \times V_0^{1/3}}{1-(1-D)^{1/3}}.$$

Figure 4:
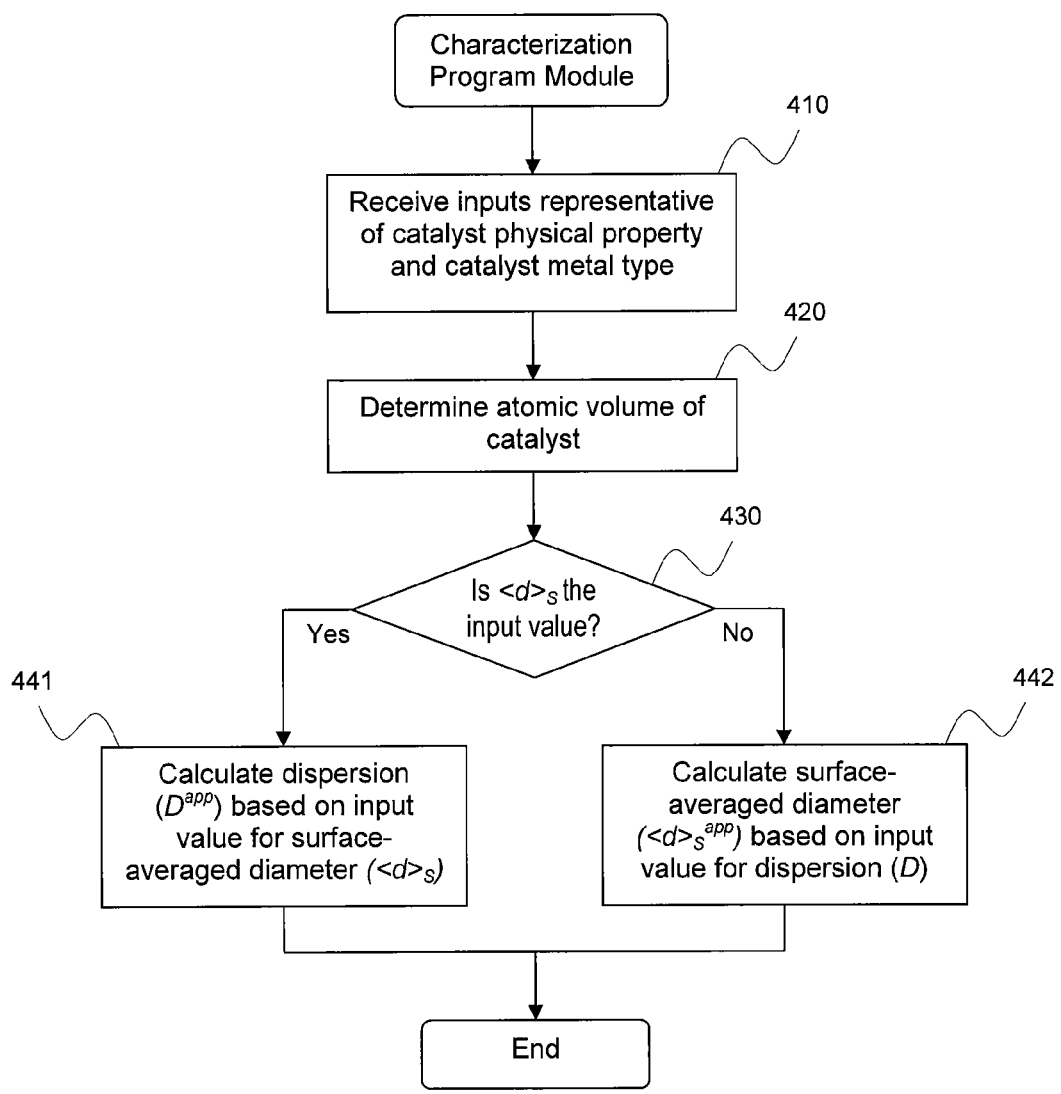
FIG. 4 is a flow diagram illustrating the steps carried out by a computer system in accordance with a computer program module for characterizing a physical property of a catalyst.

FIG. 4 is a flow diagram illustrating the steps carried out by a computer system in accordance with a computer program module for characterizing a physical property of a catalyst. The computer system includes conventional components of a computing device, e.g., a processor, system memory, a hard disk drive, input devices such as a mouse and a keyboard, and output devices such as a monitor. The computer program module for characterizing a physical property of a catalyst comprises a set of instructions that are stored in the system memory and executed by the processing unit.

In step 410, the computer system receives inputs from a user. The inputs include a physical property of a catalyst, e.g., $<d>_S$ or D of the catalyst, and identifies the metal species (one or more) of the catalyst. Based on the identification of the metal species, the computer system then computes $V_0$ of the catalyst (step 420). In step 430, the computer system determines if $<d>_S$ of the catalyst was the input value in step 410. If it was, step 441 is executed. If not, step 442 is executed. In step 441, $D^{app}$, is determined from the measured $<d>_S$ using the expression:

$$D^{app} = 1 - \left(1 - \frac{2 \times V_0^{1/3}}{<d>_S}\right)^3.$$

In step 442, $<d>_S^{app}$ of the catalyst sample, is determined from the measured D using the expression:

$$<d>_S^{app} = \frac{2 \times V_0^{1/3}}{1-(1-D)^{1/3}}.$$

Table 1 below shows columnwise from left to right: $D_{1,3}$, i.e. the dispersion value calculated for K=1.3 which represents a fairly broad particle size distribution which gives an approximate upper bound for the deviation between $D^{app}$ (shown in the second column) and the exact dispersion value for a log-normal particle size distribution. The relative deviation between $D_{1,3}$ and $D^{app}$ is shown in the third column. The largest deviation (~–10%) occurs for particle sizes of ~1 nm. For large particle sizes, on the other hand, the relative deviation tends toward zero. The dispersion value $D^{B-G}$, calculated using the conventional model with $A_m=0.081$ nm$^2$ is shown in column 4 and the relative deviation between $D_{1,3}$ and $D^{B-G}$ is shown in column 5. The relative deviation displayed in column 5 varies between –40% (1 nm) and 25% (very large particles) with a transition between negative and positive values for a particle size about 2 nm. It is important to determine the dispersion values as accurately as possible because the number of atoms in a particle distribution scales with ~$D^{-3}$.

Table 1 shows that the approximation of the shell model expression for dispersion ($D^{app}$) generally provides a much better approximation than those methods based on the model proposed by G. Bergeret and P. Gallezot ($D^{B-G}$) discussed above. The inventor has found that this is true regardless of the value of $A_m$ that is used. It is also noted that the model proposed by G. Bergeret and P. Gallezot provides dispersion values of greater than 1, a clearly erroneous result, for very small metal particle sizes (~1 nm).

TABLE 1

| $<d>_s$ (nm) | $D_{1.3}$ | $D^{app}$ | $(D_{1.3} - D^{app})/D_{1.3}$ | $D^{B-G}$: $A_m = 0.081$ nm² | $(D_{1.3} - D^{B-G})/D_{1.3}$ |
|---|---|---|---|---|---|
| 1 | 0.80 | 0.87 | −0.095 | 1.12 | −0.40 |
| 1.1 | 0.76 | 0.83 | −0.096 | 1.01 | −0.34 |
| 1.2 | 0.73 | 0.80 | −0.095 | 0.93 | −0.28 |
| 1.3 | 0.70 | 0.76 | −0.092 | 0.86 | −0.23 |
| 1.4 | 0.67 | 0.73 | −0.089 | 0.80 | −0.19 |
| 1.5 | 0.64 | 0.70 | −0.085 | 0.74 | −0.16 |
| 2 | 0.54 | 0.57 | −0.069 | 0.56 | −0.041 |
| 3 | 0.40 | 0.42 | −0.048 | 0.37 | 0.066 |
| 4 | 0.32 | 0.33 | −0.036 | 0.28 | 0.11 |
| 5 | 0.26 | 0.27 | −0.029 | 0.22 | 0.14 |
| 6 | 0.22 | 0.23 | −0.025 | 0.19 | 0.16 |
| 7 | 0.19 | 0.20 | −0.021 | 0.16 | 0.17 |
| 8 | 0.17 | 0.17 | −0.018 | 0.14 | 0.18 |
| 9 | 0.15 | 0.16 | −0.016 | 0.12 | 0.19 |
| 10 | 0.14 | 0.14 | −0.015 | 0.11 | 0.20 |
| 30 | 0.048 | 0.049 | −0.0050 | 0.037 | 0.23 |
| 60 | 0.024 | 0.024 | −0.0024 | 0.019 | 0.24 |
| 100 | 0.015 | 0.015 | −0.0014 | 0.011 | 0.24 |
| ∞ | 0 | 0 | 0 | 0 | 0.25 |

The computer program module may be configured to receive inputs for an estimate of K. In such a case, the error range of the approximated dispersion may be generated. Also, the metal particle size distribution of the catalyst may be generated from the expressions for S and M, which are the parameters that define the log-normal size probability density distribution function, P, as defined below.

$$S = \sqrt{\ln\left(\frac{<d>_V}{<d>_S}\right)}$$

$$M = \frac{7}{2} \times \ln<d>_S - \frac{5}{2} \times \ln<d>_V$$

$$P(d) = \frac{1}{\sqrt{2\pi} \times S \times d} \times \exp(-(\ln(d) - M)^2 / 2S^2)$$

While particular embodiments according to the invention have been illustrated and described above, those skilled in the art understand that the invention can take a variety of forms and embodiments within the scope of the appended claims.

What is claimed is:

1. A catalyst characterization method comprising the steps of:
   preparing a catalyst sample for analysis, the catalyst sample having a plurality of supported metal particles;
   measuring the size of the metal particles and determining a surface-averaged diameter of the metal particles ($<d>_S$) therefrom;
   determining an atomic volume of the metal particles ($V_0$); and
   calculating a dispersion ($D^{app}$) of the metal particles based on the following relationship:

$$D^{app} = 1 - \left(1 - \frac{2 \times V_0^{1/3}}{<d>_S}\right)^3.$$

2. The method according to claim 1, further comprising the step of obtaining transmission electron microscopy (TEM) images of the supported metal particles, wherein the size distribution of the metal particles is used to determine $<d>_S$.

3. The method according to claim 1, wherein the catalyst sample includes a plurality of supported metal particles containing a single metal species.

4. The method according to claim 3, wherein the atomic volume is based on the number of atoms per unit cell of the metal species, lattice parameters of the metal species and angles associated with the lattice parameters.

5. The method according to claim 1, wherein the catalyst sample includes a plurality of supported metal particles containing more than one metal species.

6. The method according to claim 1, further comprising generating error ranges for the computed dispersion.

7. A catalyst characterization method comprising the steps of: preparing a catalyst sample for analysis, the catalyst sample having a plurality of supported metal particles;
   determining a dispersion of the metal particles (D);
   determining an atomic volume of the metal particles ($V_0$); and
   calculating a surface-averaged diameter of the metal particles ($<d>_S^{app}$) based on the following relationship:

$$<d>_S^{app} = \frac{2 \times V_0^{1/3}}{1 - (1 - D)^{1/3}}.$$

8. The method according to claim 7, further comprising the step of conducting tests on the catalyst sample to determine the dispersion of supported metal species.

9. The method according to claim 8, further comprising the step of conducting chemisorption tests on the catalyst sample to determine the dispersion of supported metal species.

10. The method according to claim 7, wherein the catalyst sample includes a plurality of supported metal particles containing a single metal species.

11. The method according to claim 10, wherein the atomic volume is based on number of atoms per unit cell of the metal species, lattice parameters of the metal species and angles associated with the lattice parameters.

12. The method according to claim 7, wherein the catalyst sample includes a plurality of supported metal particles containing more than one metal species.

13. The method according to claim 7, further comprising generating error ranges for the computed surface-averaged diameter.

14. A computer-readable storage medium having stored thereon instructions to be executed in a computer system to determine a physical property of a catalyst sample, the instructions causing the computer system to carry out the steps of: receiving inputs specifying an input value representative of a physical property of the catalyst sample and one or more types of metal species;
   computing an atomic volume of the specified metal species ($V_0$); and
   computing an output value representative of a physical property of the catalyst sample based on one of the following equations:

$$D^{app} = 1 - \left(1 - \frac{2 \times V_0^{1/3}}{<d>_S}\right)^3.$$

if the surface-averaged diameter of the metal particles in the catalyst sample ($<d>_S$) is the input value, or $$<d>_S^{app} = \frac{2 \times V_0^{1/3}}{1 - (1-D)^{1/3}},$$

if the dispersion of the metal particles in the catalyst sample (D) is the input value.

15. The computer-readable storage medium according to claim 14, wherein the atomic volume is computed based on crystallographic parameters of the specified metal species, including the number of atoms per unit cell of the metal species, lattice constants and associated angles.

16. The computer-readable storage medium according to claim 15, wherein the instructions cause the computer system to further carry out the step of retrieving the crystallographic parameters of the specified metal species from a database.

17. The computer-readable storage medium according to claim 14, wherein the instructions cause the computer system to further carry out the step of receiving an input specifying a first mode of operation or a second mode of operation.

18. The computer-readable storage medium according to claim 17, wherein if the first mode of operation is selected, the output value representative of a physical property of the catalyst sample is computed based on the following equation:

$$D^{app} = 1 - \left(1 - \frac{2 \times V_0^{1/3}}{<d>_S}\right)^3,$$

and if the second mode of operation is selected, the output value representative of a physical property of the catalyst sample is computed based on the following equation:

$$<d>_S^{app} = \frac{2 \times V_0^{1/3}}{1 - (1-D)^{1/3}}.$$

19. The computer-readable storage medium according to claim 14, wherein the instructions cause the computer system to further carry out the step of generating an error range for the computed output value.

20. The computer-readable storage medium according to claim 14, wherein the instructions cause the computer system to further carry out the step of receiving an input specifying an estimate of the ratio of the volume-averaged diameter of the supported metal particles in the catalyst sample ($<d>_V$) to the surface-averaged diameter of the supported metal particles in the catalyst sample ($<d>_S$).

21. The computer-readable storage medium according to claim 20, wherein the instructions cause the computer system to further carry out the step of generating a log-normal distribution of the supported metal particles based on the volume-averaged diameter of the metal particles in the catalyst sample and the surface-averaged diameter of the metal particles in the catalyst sample.

22. The computer-readable storage medium according to claim 20, wherein the instructions cause the computer system to further carry out the step of calculating the raw moments $<d>$, $<d^2>$ and $<d^3>$ of the metal particles in the catalyst sample.

23. The computer-readable storage medium according to claim 20, wherein the instructions cause the computer system to further carry out the step of calculating the dispersion using the full expression according to:

$$D = 6(V_0)^{1/3} \times \frac{<d^2>}{<d^3>} - 12(V_0)^{2/3} \times \frac{<d>}{<d^3>} + 8V_0 \times \frac{1}{<d^3>},$$

where $<d>$, $<d^2>$ and $<d^3>$ are the raw moments of the metal particles in the catalyst sample.

24. The computer-readable storage medium according to claim 20, wherein the instructions cause the computer system to further carry out the step of calculating the dispersion using the full expression for a log-normal metal particle size distribution according to:

$$D = \frac{6 \times V_0^{1/3}}{<d>_S} - \frac{12 \times V_0^{2/3} \times K}{<d>_S^2} + \frac{8 \times V_0 \times K^3}{<d>_S^3},$$

where $<d>_S$ is the surface-averaged size of the metal particles in the catalyst sample, $K = <d>_V / <d>_S$, and $<d>_V$ is the volume-averaged size of the metal particles in the catalyst sample.

* * * * *